(12) United States Patent
Nielsen

(10) Patent No.: US 6,457,657 B1
(45) Date of Patent: Oct. 1, 2002

(54) ATOMIZER WHEEL WITH WEAR-RESISTANT INSERTS

(75) Inventor: Erling Skov Nielsen, Hillerod (DK)

(73) Assignee: Niro A/S, Soeborg (DK)

( * ) Notice: Subject to any disclaimer, the term of this patent is extended or adjusted under 35 U.S.C. 154(b) by 17 days.

(21) Appl. No.: 09/654,500

(22) Filed: Sep. 1, 2000

(51) Int. Cl.$^7$ ................................................ B05B 3/10
(52) U.S. Cl. ........................................ 239/224; 239/591
(58) Field of Search ............................... 239/390, 222, 239/222.11, 223, 224, 228, 390.3, 590.5, 591

(56) References Cited

U.S. PATENT DOCUMENTS

| | | |
|---|---|---|
| 3,454,226 A | 7/1969 | Nielsen |
| 3,640,467 A | 2/1972 | Moller et al. |
| 3,887,133 A | 6/1975 | Straarup et al. |
| RE29,083 E | 12/1976 | Nielsen |
| 4,121,770 A | 10/1978 | Straarup et al. |
| 4,303,200 A | 12/1981 | Hansen |
| RE30,963 E | 6/1982 | Moller et al. |
| RE32,064 E | 1/1986 | Nielsen |
| 4,684,065 A | 8/1987 | Svarrer |
| 4,898,331 A | 2/1990 | Hansen et al. |
| 5,226,605 A | 7/1993 | Bazergui et al. |
| 5,294,059 A | 3/1994 | Willan |
| 5,356,075 A | * 10/1994 | Heide et al. ................. 239/223 |
| 5,370,310 A | 12/1994 | Willan |

* cited by examiner

Primary Examiner—Lisa A. Douglas
(74) Attorney, Agent, or Firm—Sugrue Mion, PLLC

(57) ABSTRACT

The atomizer wheel includes a plurality of ejection apertures distributed over the circumference of an external wall, in which a plurality of inserts are arranged. The inserts each includes a bushing and a wear-resistant lining arranged in the bushing such that a contact surface of the lining abuts against an internal side of the bushing. Each insert is provided with a transition surface extending between an inner end face of the lining and the contact surface, and the transition surface includes at least one portion forming an angle with the contact surface, by which it is possible to direct the flow of the material to be atomized along the transition surface of the lining and farther down to the inner side of the external wall and thus avoid wear on the bushing.

22 Claims, 1 Drawing Sheet

ATOMIZER WHEEL WITH WEAR-RESISTANT INSERTS

FIELD OF THE INVENTION

Figure 1:
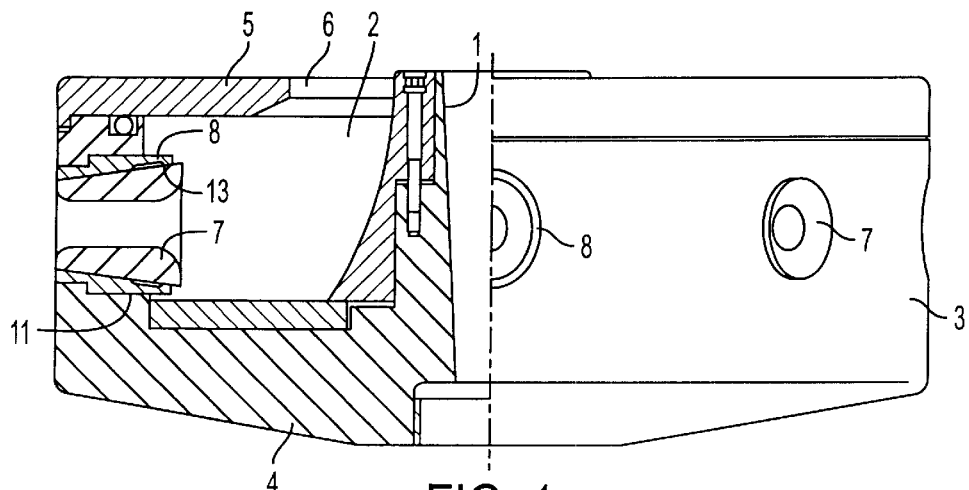
Figure 2:
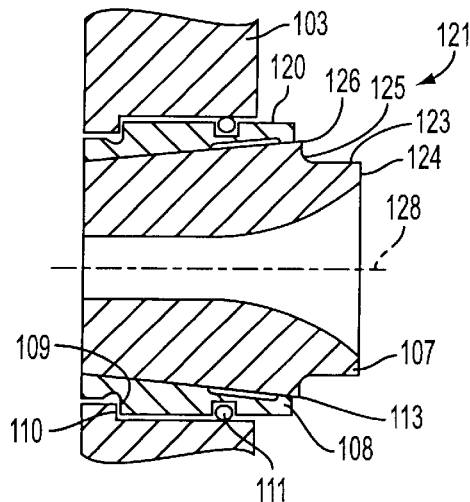
Figure 3:
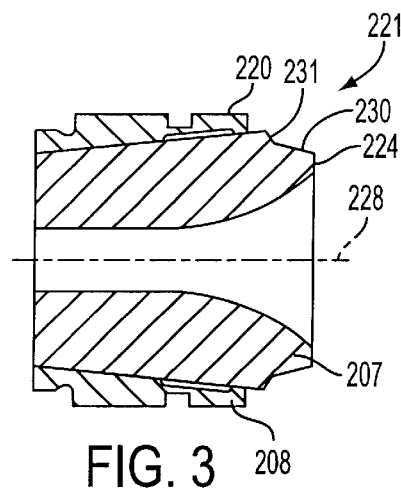
Figure 4:
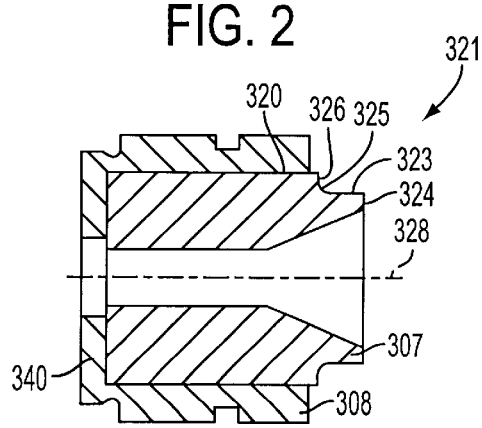
Figure 5:
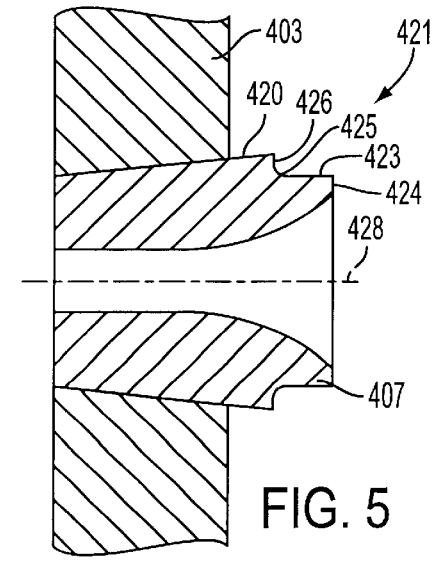

The present invention relates to an atomizer wheel for the atomization of slurries of abrasive material, comprising a wheel hub and a mainly cylindrical external wall defining an annular chamber of a substantially bowl-like cross-sectional shape coaxially surrounding said hub, a plurality of ejection apertures, each extending in a substantially radial direction, distributed over the circumference of said external wall, and a plurality of inserts arranged in said ejection apertures, each insert having a longitudinal axis extending in said substantially radial direction and comprising a bushing, the external side of which is fitting into said external wall, and a wear-resistant lining arranged in said bushing such that a contact surface of said lining abuts against an internal side of said bushing, the inner end of each of said inserts projecting into said annular chamber.

The invention further relates to an insert for use in such a wheel.

BACKGROUND OF THE INVENTION

During atomization of a slurry such inserts are exposed to wear which, depending on the material to be atomized, may even be very heavy. This wear is normally restricted, however, to certain well defined areas and for that reason the bushings/linings are preferably mounted so that they can be turned as they are gradually being worn in order to increase their lifetime.

A number of precautions have been taken in order to prevent deformation and fracture of the inserts, eg. as disclosed in U.S. Pat. Nos. 3,640,467 and 4,684,065 (Niro).

In both of these documents the inserts project a distance into the annular space in the wheel in order to ensure that a layer of liquid will deposit on the external wall during the rotation of the wheel and hereby prevent wear. Owing to the centrifugal forces the heavier parts of the layer, i.e. the suspended solid material, is separated from the liquid in the layer and deposited directly on the wall so as to fill the area surrounding the inwardly extending portions of the inserts.

The principle of the abrasion resistant atomizer wheel is as follows:

Parts exposed to abrasion from feed are abrasion resistant and replaceable. The inner surface of the wheel rim which is also exposed to contact with the feed is protected against abrasion by the unique principle of inwards-protruding inserts. During operation a layer of feed solids will settle on the inside wall to a thickness determined by the length of the protrusion, consequently the abrasion will take place on the sedimented layer itself and not on the inside wall of the wheel.

It has turned out, however, that during atomization of some abrasive slurries, the foremost part of the inserts, seen in the tangential or rotational direction, is exposed to an extremely high wear which has entailed that not only the wear-resistant lining but also the steel bushing show sign of wear. It is believed that this effect in due to the fact that whirl formation prevents the formation of a protective layer locally at the front end of the inserts. The consequences are that the inserts have to be changed frequently in order to prevent wear on the atomizer wheel itself, which could lead to damage of the circumferential external wall of the wheel and eventually breakdown of the atomizer wheel.

SUMMARY OF THE INVENTION

With this background it is an object of the present invention to provide an atomizer wheel which is able to perform atomization of even very abrasive material without the need for frequent replacement of the inserts and in which the risk of damage of the wheel itself is almost eliminated.

This object is met by an atomizer wheel of the initially stated kind, which is characterized in that each insert is provided with a transition surface extending between an inner end face of the lining and said contact surface, and that said transition surface comprises at least one portion forming an angle with said contact surface.

By this design it is possible to direct the flow of the material to be atomized along the transition surface of the lining and further down to the inner side layer on the external wall and thus avoid wear on the bushing. Without intending to limit the scope of the invention to a specific explanation, it is believed that the whirl which is formed in front of the inserts in traditional atomizer wheels is controlled as to direction to such an extent that it is now possible to form a coherent layer of protective material on the inner side of the external wall and that any remaining detrimental effects of such a whirl only effect the lining and not the bushing.

Furthermore, it has turned out that the vibrations of the drive shaft in an atomizer wheel according to the invention are reduced, apparently due to a more controlled flow in the atomizer wheel.

In a preferred embodiment, the transition surface is substantially concave, by which it is secured that the transition surface leads the flow past the bushing by imparting on the slurry to be atomized a substantial change of directions.

In another aspect of the invention, an insert for an atomizer wheel is provided, said insert having a longitudinal axis and comprising a bushing and a wear-resistant lining arranged in said bushing such that a contact surface of said lining abuts against an internal side of said bushing. The insert is characterized in that said insert is provided with a transition surface extending between an inner end face of the lining and said contact surface, and that said transition surface comprises at least one portion forming an angle with said contact surface.

Further advantageous embodiments of the invention are the subject of the remaining dependent claims.

In the following the invention will be described in further detail by means of an embodiment thereof and the appended drawings.

BRIEF DESCRIPTION OF THE DRAWINGS

FIG. 1 is a partial sectional view of a prior art atomizer wheel,

FIGS. 2 to 5 are sectional views on a larger scale of four different embodiments of an insert according to the invention.

DESCRIPTION OF PREFERRED EMBODIMENTS

The prior art atomizer wheel illustrated in FIG. 1 is disclosed in U.S. Pat. No. 4,684,065 (Niro), incorporated herein by reference, and comprises an annular chamber 2 having a substantially bowl-like cross-sectional shape and being delimited by a central hub 1, a substantially cylindrical external wall 3, a bottom portion 4 and a cover 5. In the cover 5 an aperture 6 is provided concentrically around the hub 1 through which the slurry to be atomized is supplied to the atomizer wheel.

Along the circumference of the external wall 3 of the atomizer wheel a number of ejection apertures are provided, through which a supplied slurry is ejected outwards in atomized form during operation into a surrounding drying chamber in which the fine particles formed by the atomization are dried so that their content of solids drops down to the bottom of the drying chamber as a fine powder. In order to prevent wear on the atomizer wheel itself nozzles or inserts in the shape of steel bushings 8 with wear resistant linings 7 are inserted in the individual ejection apertures.

The bushing 8 is made from steel and is provided with an outwardly directed shoulder abutting against a correspondingly shaped, oppositely directed shoulder in the ejection aperture. The bushing 8 is fitted loosely in the aperture and, in order to prevent particles from penetrating into the clearance thus provided, it is sealed against the external wall 3 by means of a sealing ring 11 arranged near the inner surface of the wall 3. A conical lining 7 of a wear-resistant, preferably ceramic material is inserted in the steel bushing.

To allow elastic deformation of the bushing without transferring excessive stresses to the ceramic lining 7, the bushing 8 is provided with a flat recess 13 in its internal surface facing the lining. In the embodiment shown, the recess 13 extends from below the recess of the sealing ring 11 and close to the inner end of the bushing 8, i.e. substantially throughout that portion of the bushing which in the worst case is exposed to stressed which if transferred directly to the ceramic lining could damage it.

In the preferred embodiment, shown in FIG. 2, reference numerals having the same or analogous function as the prior art atomizer wheel and insert carry the same numerals to which 100 is added.

The bushing 108 of the insert according to the invention is designed in substantially the same manner as in the prior art and is fitted into the external wall 103, in which an outwardly directed shoulder 109 on the bushing 108 abuts against a correspondingly shaped, oppositely directed shoulder 110 in the ejection aperture. The bushing 108 comprises a central conical bore which receives the lining 107 having a corresponding conical contact surface 120. The structure of the atomizer wheel is not critical, and other parts thereof may be designed in other ways than described in the above. For instance, the cylindrical external wall may be included in a separate part instead of being an integrated part of the bottom portion. The bushing 108 may furthermore be of any suitable material other than steel.

At the inner end of the lining 107 extending into the annular space of the atomizer wheel a transition surface generally designated 121 is provided. In the embodiment shown, the transition surface 121 is of a mainly concave shape and comprises a first rectilinear portion 123 extending at right angles with respect to an inner end face 124 of the lining 107, ie. substantially in parallel with a longitudinal axis 128 of the insert. A rounded portion 125 connects the first portion 123 with a second portion 126 adjacent the contact surface 120 of the lining 107. The second portion 126 extends substantially perpendicularly to the first portion 123 which entails that the direction of the flow of the slurry to be atomized is changed by virtually 90 degrees and is thus led past the -bushing 108 and further onto the inner side of the external wall 103.

In the embodiment shown in FIG. 3 only parts relating to the present invention will be described in detail. 100 is added to reference numerals of elements having the same or analogous function as in the embodiment of FIG. 2.

The transition surface 221 is in this embodiment composed of two mainly rectilinear portions 230 and 231 having gradually increasing angles with respect to the longitudinal axis 228 of the insert. It is also conceivable that the transition surface may comprise more than two portions, or only one portion thus forming a bevelled transition surface.

The transition surface may be designed as any suitable surface or combination of surface portions having an all in all concave shape.

In the embodiment of FIG. 4, in which like or analogous elements compared to the embodiment of FIG. 2 carry the same reference numerals with 200 added to them. The transition surface 321 is designed in the same manner as in the embodiment of rig. 2. However, in both of the above embodiments of FIGS. 2 and 3, the contact surface 120, 220 of the lining 107 and 207, respectively, is conical with respect to the longitudinal axis 128, 220 of the insert. In the embodiment of FIG. 4, the contact surface 320 is parallel to the longitudinal axis of the insert, and the bushing 308 comprises a supporting portion 340 at the outer end of the bushing. In this embodiment there is a risk that wear on the outer side of the atomizer wheel may cause damage to the supporting portion 340. The consequences of such damage are, at worst, that the lining of such a damaged insert due to the centrifugal forces works itself loose.

The inserts of the atomizer wheel according to the invention may be of varying lengths as described in further detail in U.S. Pat. No. 4,898,331 (Niro).

In the case of atomizer wheels, in which the load is less heavy, it is possible to use an insert as shown in FIG. 5. In this embodiment, the external surface 420 of the lining 407, which corresponds to the contact surface described in the previous embodiments, is fitted directly into the external wall 403 of the atomizer wheel, ie. there is no bushing. At the inner end of the insert/lining 407 a transitions surface 421 designed in the same manner as in the embodiment of FIG. 2 extends between the inner end face 424 and the external surface 420.

It is furthermore possible to design inserts in the form of spoke-like projections of the kind disclosed in U.S. Pat. No. 3,887,133 (Niro) with a transition surface extending between an inner end face of the insert and the external surface.

The invention should not be regarded as being limited to the embodiment described in the above but various modifications of the atomizer wheel and the inserts may be carried out without departing from the scope of the appended claims.

What is claimed is:

1. An atomizer wheel for atomizing slurries of abrasive material, comprising:

a wheel hub and a mainly cylindrical external wall defining an annular chamber of a substantially bowl-like cross-sectional shape coaxially surrounding said hub, a plurality of ejection apertures, each extending in a substantially radial direction, distributed over the circumference of said external wall, and a plurality of inserts arranged in said ejection apertures, each insert having a longitudinal axis extending in said substantially radial direction and comprising a bushing, the external side of which is fitted into said external wall, and a wear-resistant lining arranged in said bushing such that a contact surface of said lining abuts against an internal side of said bushing, the inner end of each of said inserts projecting into said annular chamber, characterized that each insert is provided with a transition surface extending between an inner end face of the lining and said contact surface, and that said transition surface comprises at least one portion forming an angle with said contact surface.

2. An atomizer wheel according to claim 1, characterized in that said transition surface is of a substantially concave shape.

3. An atomizer wheel according to claim 2, characterized in that said transition surface comprises at least two mainly rectilinear portions.

4. An atomizer wheel according to claim 3, characterized in that a first portion extends at substantially right angles with respect to the inner end face and a second portion substantially perpendicularly to the first portion, a rounded portion connecting said first and second portions.

5. An atomizer wheel according to claim 3, characterized in that said portions have gradually increasing angles with respect to the longitudinal axis of the insert.

6. An atomizer wheel according to claim 1, characterized in that said transition surface is bevelled.

7. An atomizer wheel according to claim 1, characterized in that said contact surface is conical with respect to the longitudinal axis of the insert.

8. An atomizer wheel according to claim 1, characterized in that said contact surface is parallel to the longitudinal axis of the insert, and that the bushing comprises a supporting portion at the outer end of the bushing.

9. An insert for an atomizer wheel, said insert having a longitudinal axis and comprising a bushing and a wear-resistant lining arranged in said bushing such that a contact surface of said lining abuts against an internal side of said bushing, characterized in that said insert is provided with a transition surface extending between an inner end face of the lining and said contact surface, and that said transition surface comprises at least one portion forming an angle with said contact surface.

10. An insert according to claim 9, characterized in that said transition surface is of a substantially concave shape.

11. An insert according to claim 10, characterized in that said transition surface comprises at least two mainly rectilinear portions.

12. An insert according to claim 11, characterized in that a first portion extends at substantially right angles with respect to the inner end face and a second portion substantially perpendicularly to the first portion, a rounded portion connecting said first and second portions.

13. An insert according to claim 11, characterized in that said portions have gradually increasing angles with respect to the longitudinal axis of the insert.

14. An insert according to claim 9, characterized in that said transition surface is bevelled.

15. An insert according to claim 9, characterized in that said contact surface is conical with respect to the longitudinal axis of the insert.

16. An insert according to claim 9, characterized in that said contact surface is parallel to the longitudinal axis of the insert, and that the bushing comprises a supporting portion at the outer end of the bushing.

17. An insert for an atomizer wheel, said insert having a longitudinal axis and comprising an inner end face and an external surface, characterized in that said insert is provided with a transition surface extending between said inner end face of the insert and said external surface, and that said transition surface comprises at least one portion forming an angle with said external surface.

18. An insert according to claim 17, characterized in that said transition surface is of a substantially concave shape.

19. An insert according to claim 18, characterized in that said transition surface comprises at least two mainly rectilinear portions.

20. An insert according to claim 19, characterized in that a first portion extends at substantially right angles with respect to the inner end face and a second portion substantially perpendicularly to the first portion, a rounded portion connecting said first and second portions.

21. An insert according to claim 19, characterized in that said portions have gradually increasing angles with respect to the longitudinal axis of the insert.

22. An insert according to claim 17, characterized in that said transition surface is bevelled.

* * * * *